United States Patent
Huibers et al.

(10) Patent No.: US 9,607,024 B2
(45) Date of Patent: Mar. 28, 2017

(54) SHARING INFORMATION WITH OTHER USERS

(71) Applicant: Bump Technologies, Inc., Mountain View, CA (US)

(72) Inventors: Andrew G. Huibers, Sunnyvale, CA (US); David F. Lieb, San Francisco, CA (US); Kevin N. Gabayan, Santa Clara, CA (US); Seth T. Raphael, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 13/917,219

(22) Filed: Jun. 13, 2013

(65) Prior Publication Data

US 2013/0339358 A1    Dec. 19, 2013

Related U.S. Application Data

(60) Provisional application No. 61/659,305, filed on Jun. 13, 2012, provisional application No. 61/675,161, filed on Jul. 24, 2012.

(51) Int. Cl.
*G06F 17/30* (2006.01)

(52) U.S. Cl.
CPC .. *G06F 17/30312* (2013.01); *G06F 17/30165* (2013.01)

(58) Field of Classification Search
None
See application file for complete search history.

(56) References Cited

U.S. PATENT DOCUMENTS

| | | | |
|---|---|---|---|
| 8,046,411 B2 * | 10/2011 | Hayashi et al. | 709/204 |
| 8,805,814 B2 * | 8/2014 | Zijlstra | G06F 17/30646 707/707 |
| 2008/0080774 A1 * | 4/2008 | Jacobs | H04N 1/00132 382/220 |
| 2009/0234876 A1 | 9/2009 | Schigel et al. | |
| 2010/0293198 A1 | 11/2010 | Marinucci et al. | |
| 2011/0211737 A1 | 9/2011 | Krupka et al. | |
| 2012/0227256 A1 | 9/2012 | Clew et al. | |
| 2014/0047023 A1 * | 2/2014 | Baldwin | G06Q 10/10 709/204 |

OTHER PUBLICATIONS

International Search Report and Written Opinion dated Sep. 24, 2013, issued by the Korean Intellectual Property Office for related PCT Patent Application No. PCT/US2013/045694.

\* cited by examiner

*Primary Examiner* — Belix M Ortiz Ditren
(74) *Attorney, Agent, or Firm* — Troutman Sanders LLP; James E. Schutz; Christopher C. Close, Jr.

(57) ABSTRACT

Systems and techniques are described for facilitating sharing information. Some embodiments can receive a set of data items that is to be analyzed for sharing, analyze the set of data items based on a first set of criteria to obtain a subset of the set of data items that is a likely candidate for sharing, and present the subset of the set of data items to a first user. Additionally, some embodiments can receive a set of users that is to be analyzed for sharing information, analyze the set of users based on a second set of criteria to obtain a subset of the set of users with whom the information is likely to be shared, and present the subset of the set of users to the first user.

9 Claims, 6 Drawing Sheets

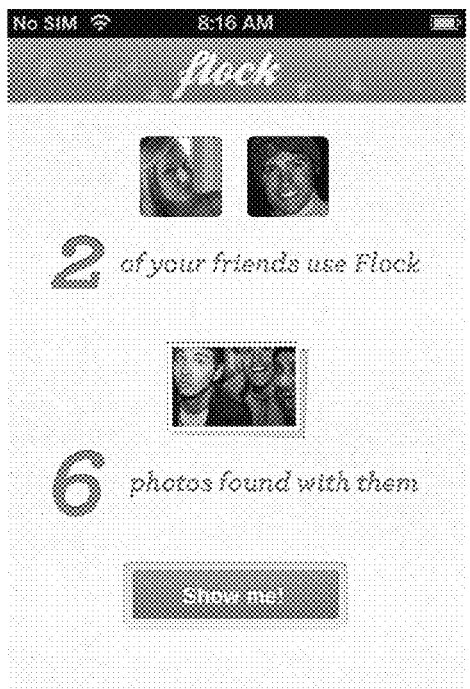
FIG. 2D
FIG. 2E
Receive a set of users that is to be analyzed for sharing information
302
Analyze the set of users based on a set of criteria to obtain a subset of the set of users with whom the information is likely to be shared
304
Present the subset of the set of users
306
FIG. 3A

SHARING INFORMATION WITH OTHER USERS

RELATED APPLICATION

This application claims priority to the following applications: (1) U.S. Provisional Application No. 61/659,305, entitled "Method and apparatus for sharing information," by inventors Andrew G. Huibers and David F. Lieb, which was filed on 13 Jun. 2012, and (2) U.S. Provisional Application No. 61/675,161, entitled "Method and apparatus for sharing information with other users," by inventors Andrew G. Huibers, David F. Lieb, Kevin N. Gabayan, and Seth T. Raphael, which was filed on 24 Jul. 2012 The above-referenced applications are herein incorporated by reference in their entirety.

BACKGROUND

This disclosure relates to communication devices. Sharing information with other users (e.g., via a smartphone) is often time consuming and cumbersome. Therefore, what are needed are methods and systems for facilitating sharing information with other users.

SUMMARY

Some embodiments described in this disclosure provide methods and/or systems to facilitate sharing information with other users. An embodiment can receive a set of data items that is to be analyzed for sharing. Next, the embodiment can analyze the set of data items based on a first set of criteria to obtain a subset of the set of data items that are likely candidates for sharing. The embodiment can then present the subset of the set of data items to a first user. Additionally, the embodiment can receive a set of users that is to be analyzed for sharing information. Next, the embodiment can analyze the set of users based on a second set of criteria to obtain a subset of the set of users with whom the information is likely to be shared. The embodiment can then present the subset of the set of users to the first user. The set of data items can include, but is not limited to, photos, videos, contact information, music, or any other information that a user may want to share with other users.

In some embodiments, the first set of criteria can include a time window and a spatial region. In these embodiments, analyzing the set of data items can involve determining data items that were created during the time window at a location that is within the spatial region.

In some embodiments, the second set of criteria can include a time window, a spatial region, and a distance threshold in a social network. In these embodiments, analyzing the set of users can involve determining users that are within the distance threshold from the first user in the social network and whose locations were within the spatial region during the time window.

In some embodiments, the subset of the set of data items and the subset of the set of users are presented together to the first user. Additionally, these embodiments can present a first set of user interface elements to the first user to enable the first user to modify the subset of the set of data items, and present a second set of user interface elements to the first user to enable the first user to modify the subset of the set of users.

BRIEF DESCRIPTION OF THE FIGURES

FIG. 2B-2E illustrates screenshots of a graphical user interface (GUI) of a device in accordance with some embodiments described herein.

FIG. 3A illustrates a process for identifying users with whom information is likely to be shared in accordance with some embodiments described herein.

DETAILED DESCRIPTION

Figure 1:
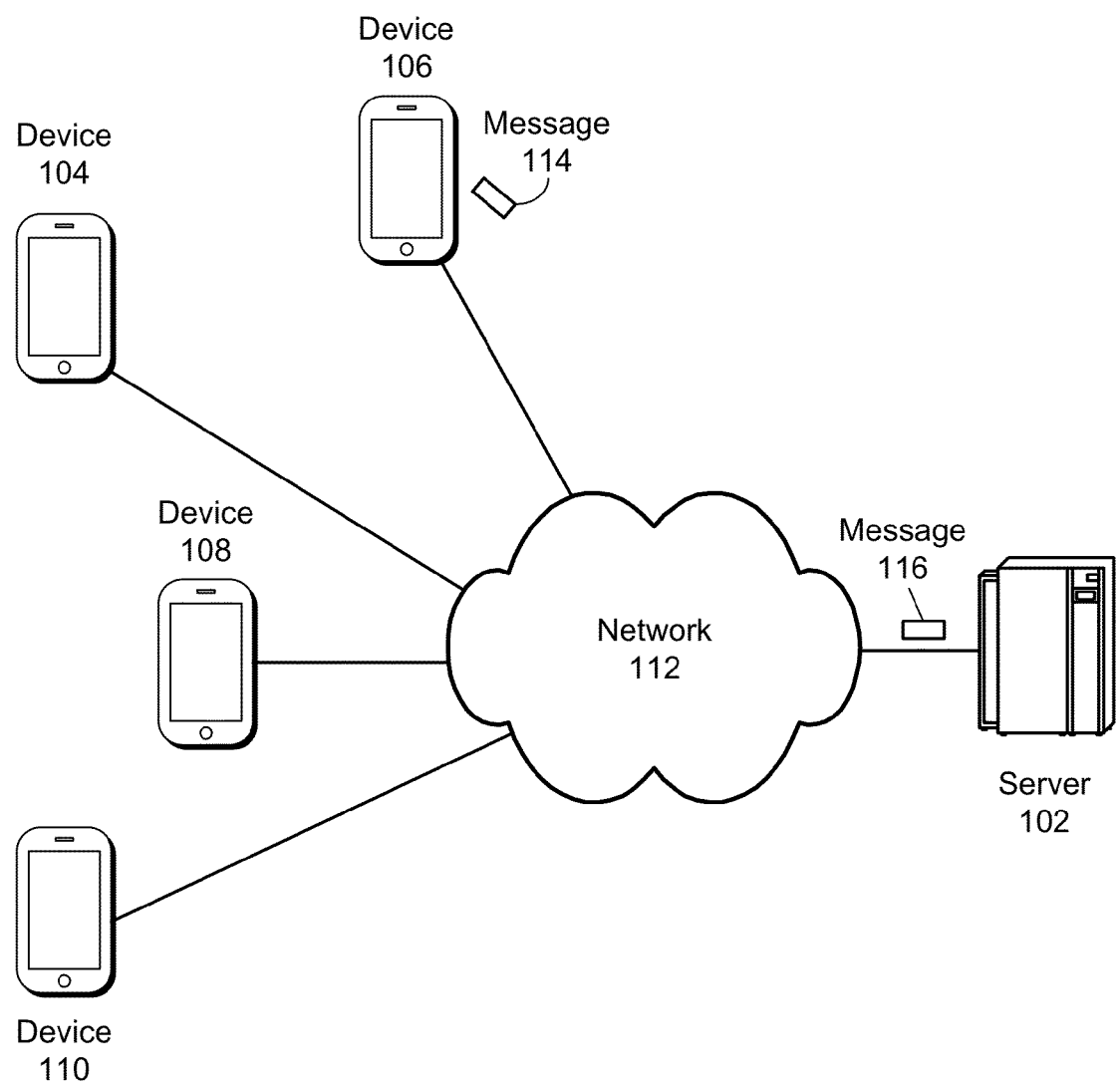
FIG. 1 illustrates a system in accordance with some embodiments described herein.

This disclosure relates to communication devices. The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory storage medium, which may be any tangible device or medium that can store code and/or data for use by a computer system. A non-transitory storage medium includes, but is not limited to, volatile memory, non-volatile memory, magnetic and optical storage devices such as disk drives, magnetic tape, CDs (compact discs), DVDs (digital versatile discs or digital video discs), or other tangible media, now known or later developed, that is capable of storing information.

The methods and processes described in this disclosure can be embodied as code and/or data, which can be stored in a non-transitory storage medium as described above. When a computer system reads and executes the code and/or data stored on the non-transitory storage medium, the computer system performs the methods and processes embodied as data structures and code and stored within the non-transitory storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

The terms "software and "software application" have been used in this disclosure. It will be apparent to one having ordinary skill in the art that, in most cases, the functionality of a given software application can be implemented using software only, using a combination of hardware and software, or using hardware only. Therefore, unless stated otherwise, the terms "software" or "software application"

are intended to cover implementations that use software only, use a combination of hardware and software, or use hardware only.

Overview

Some embodiments help a user to automatically identify information and other users who may be interested in the information that the device user may want to share. For example, if a person goes on a hike with friends and family, then some embodiments automatically prompt the person with a list of recipients (e.g., a subset or the entire set of people who went on the hike) who would be interested in information (e.g., photos, videos, etc.) associated with the hike.

In some embodiments, a software application executes on a computing platform and keeps track of information that is being created (e.g., photos that were taken and/or videos that were recorded since the last time the user shared information with other people), and creates a list of recipients with whom the user is likely to share the information. The software application can then present the user with the list of recipients, and allow the user to add/delete/modify the list. Next, the software application may take whatever action the user instructs the application to take. In some embodiments, the user may define rules that specify the action that the user wants the software application to take when the user identifies a particular list of recipients.

In some embodiments, the software application registers with the operating system on the computing platform, and requests the operating system to activate the software application when certain conditions occur. For example, the software application may provide a set of conditions which, when they occur, indicate that the user may be interested in sharing information with other users. In one example, the software application may request the operating system to activate the software application when the user moves more than a pre-determined distance from his/her previous location (e.g., 500 meters).

When the software application is activated, the software application can collect information (e.g., photos, videos, notes, etc.) that were generated since the last time the software application was activated. Next, the software application can determine whether there is anything in the collected information that the user may want to share with other users. If the software application determines that there is such information, the software application can present the user with the information and a list of recipients. The user can then decide whether and whom to send the information.

In some embodiments, the list of recipients can be automatically determined by the software application based on data associated with the collected information. Data associated with the collected information can include a geotag, a fingerprint (e.g., a fingerprint of an audio or video clip), a hash value, file metadata (e.g., author's name, file creation date, date when the file was last modified, title of the file, etc.), a face identifier (e.g., by using a face recognition process that associates one or more face identifiers with a photo), etc. For example, if the collected information includes photos that were geotagged with a location that corresponds to an elementary school, then the software application may execute a set of rules to automatically generate a list of recipients based on the geotag. In some embodiments, historical information can be analyzed to identify a correspondence between content and recipients. For example, historical information can be analyzed to identify a correspondence between photos that were taken at an elementary school and a person (e.g., the user's mother) to whom these photos were sent. Based on such analysis, a set of rules can be determined. The software application may then use such rules to automatically create a list of recipients for the collected information.

In some embodiments, the software application executes on a handheld device. When the user takes a photo or records a video using the handheld device, the software application may send only the metadata (e.g., location and time information or any other information that can be quickly generated based on the computing and bandwidth resources on the handheld device) associated with the photo/video to a server. The server can then determine a list of recipients with whom the user is likely to share the information, and send the list to the handheld device. The handheld device can then display the list of recipients to the user, and perform any actions that the user instructs the handheld to perform with regard to sharing the information.

In some embodiments, the software application identifies content that was generated by the user based on metadata associated with the content. For example, a handheld device may contain a set of photos that include photos that were generated by the user, as well as photos that were received from other sources (e.g., downloaded from a website, received from a friend, etc.). The handheld device (i.e., a software application that is executing on the handheld device) may use the metadata (e.g., the model of the camera that was used for taking the photo) to identify photos that the user took. The handheld device may then send metadata associated with only the identified photos to the server for further processing. Once the user approves the distribution of certain information (e.g., photos), only then is the information sent to the server so that the information can be distributed or shared between the identified users.

System

FIG. 1 illustrates a system in accordance with some embodiments described herein. Devices 104-110 can communicate with each other and/or with server 102 via network 112. In some embodiments described herein, a device (e.g., devices 104-110) can generally be any hardware-based device, now known or later developed, that is capable of communicating with other devices. Examples of devices can include, but are not limited to, desktop computers, laptop computers, handheld computing devices, tablet computing devices, smartphones, automatic teller machines, point of sale systems, etc.

In some embodiments described herein, when the device detects information that the user may want to share with other users, the device can execute a series of processor instructions that cause the device to collect information that the user is likely to share with other users, and present the collected information to the user. The device can also automatically determine a list of other users with whom to share the collected information and present the list to the user. In some embodiments, the device can use the time and location information to determine whether a user is likely to share a particular item of content with other users.

Network 112 can generally include any type of wired or wireless communication channel, now known or later developed, that enables two or more devices to communicate with one another. Network 112 can include, but is not limited to, a local area network, a wide area network, or a combination of networks.

Server 102 can generally be any system that is capable of performing computations and that is capable of communicating with other devices. Server 102 can be a computer system, a distributed system, a system based on cloud computing, or any other system, now known or later developed, that is capable of performing computations.

A device can send a message to a server. For example, device 106 can send message 114 to server 102 through network 112. In response, server 102 can send message 116 to device 106. The reverse sequence of operations is also possible, i.e., the server first sends a message to a device and then the device responds with a message. Finally, in yet another embodiment, the message may be sent only one way (i.e., either from the device to the server or from the server to the device) without requiring that a corresponding message be sent in the reverse direction. In this disclosure, the term "message" generally refers to a group of bits that are used for conveying information. In connection-oriented networks, a message can be a series of bits. In datagram-oriented networks, a message can include one or more units of data, e.g., one or more packets, cells, or frames.

Figure 2A:
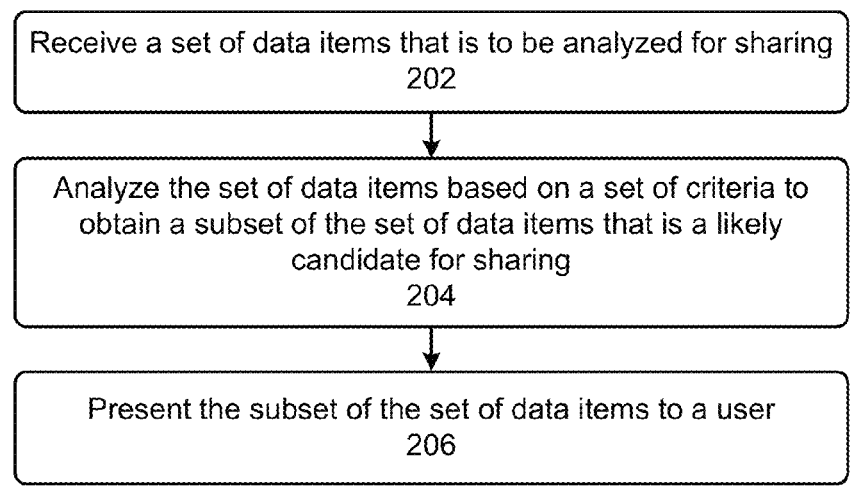
FIG. 2A presents a flowchart that illustrates a process for sharing data items in accordance with some embodiments described herein.

Identifying information that a user may want to share FIG. 2A illustrates a process for identifying information that a user may want to share with other users in accordance with some embodiments described herein. The process can begin with receiving a set of data items that is to be analyzed for sharing (operation 202). Next, the set of data items can be analyzed based on a set of criteria to obtain a subset of the set of data items that is a likely candidate for sharing (operation 204). The process can then present the subset of the set of data items to a user (operation 206). In some embodiments, the set of criteria can include a time window and a spatial region. In these embodiments, analyzing the set of data items can involve determining data items that were created during the time window at a location that is within the spatial region.

The information that is considered for sharing may originate from a device, camera, application, or any other source that is capable of generating shareable information. In some embodiments, certain types of information (e.g., based on the file extension) can be immediately flagged as information that the user is likely to share with other users. In some embodiments, the information on the handheld device can be grouped into events (at a single level of granularity or at multiple hierarchical levels of granularity) based on the metadata associated with the information. For example, the time and location information associated with photos can be used to group photos into events. Once the information has been grouped into distinct events, a set of co-proximate users can be determined for each event.

FIG. 2B-2E illustrates screenshots of a GUI 250 of a device in accordance with some embodiments described herein. In the embodiment shown in FIGS. 2B-2E, the set of photos on a device has been selected as the set of data items that are to be analyzed for sharing, and the set of criteria that is used to determine a subset of the set of data items is a set of friends who use an application for sharing information and who were co-proximate with the user.

Figure 2B:
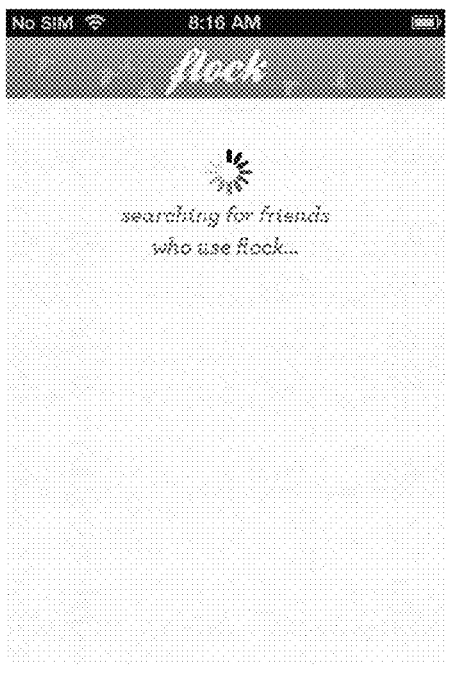
Figure 2C:

FIG. 2B illustrates a screenshot that shows an executing application for sharing information with other users, wherein the executing application is searching for friends of the user who also use the application. FIG. 2C illustrates a screenshot after the executing application has determined that two friends also use the application. FIG. 2C also illustrates that the executing application is now searching for the photos that are likely candidates to be shared with the two friends. FIG. 2D illustrates that the application has found six photos so far that were taken while one or both friends were co-proximate with the user. Finally, FIG. 2E illustrates the subset of the set of photos that was identified as a likely candidate for sharing.

Determining a Set of Users with Whom to Share Information

FIG. 3A illustrates a process for identifying users with whom information is likely to be shared in accordance with some embodiments described herein. The process can begin with receiving a set of users that is to be analyzed for sharing information (operation 302). Next, the set of users can be analyzed based on a set of criteria to obtain a subset of the set of users with whom the information is likely to be shared (operation 304). The process can then present the subset of the set of users (operation 306).

In some embodiments, the set of criteria can include a time window, a spatial region, and a distance threshold in a social network. In these embodiments, analyzing the set of users can involve determining users that are within the distance threshold from the first user in the social network and who were within the spatial region during the time window. According to one definition, two users are co-proximate to each other if the two users are within a given spatial region during a given time window.

A social network can be viewed as a network of vertices, wherein each vertex represents a social entity, e.g., a person, a company, etc. An edge between two vertices can represent a direct relationship (e.g., a "friend" relationship) between the entities that correspond to the two vertices. A distance between two vertices in a social network can be defined as the number of edges in a shortest path between the two vertices in the social network. For example, a user's friend is at a distance of "1" from the user in the social network, whereas a user's friend's friend who is not the user's friend is at a distance of "2" from the user in the social network, and so forth. A distance threshold can specify the maximum distance that is allowed between a given user and another user in the social network. Note that a distance threshold can be used to specify a subset of the set of users in the social network. For example, if the distance threshold is equal to "1," then only a user's friends would be in the subset because only the user's friends are within a distance threshold of "1" from the user. On the other hand, if the distance threshold is equal to "2," then all of the user's friends, and also the friends of the user's friends would be in the subset because all of the user's friends, and also the friends of the user's friends are within a distance threshold of "2" from the user.

Figure 3B:
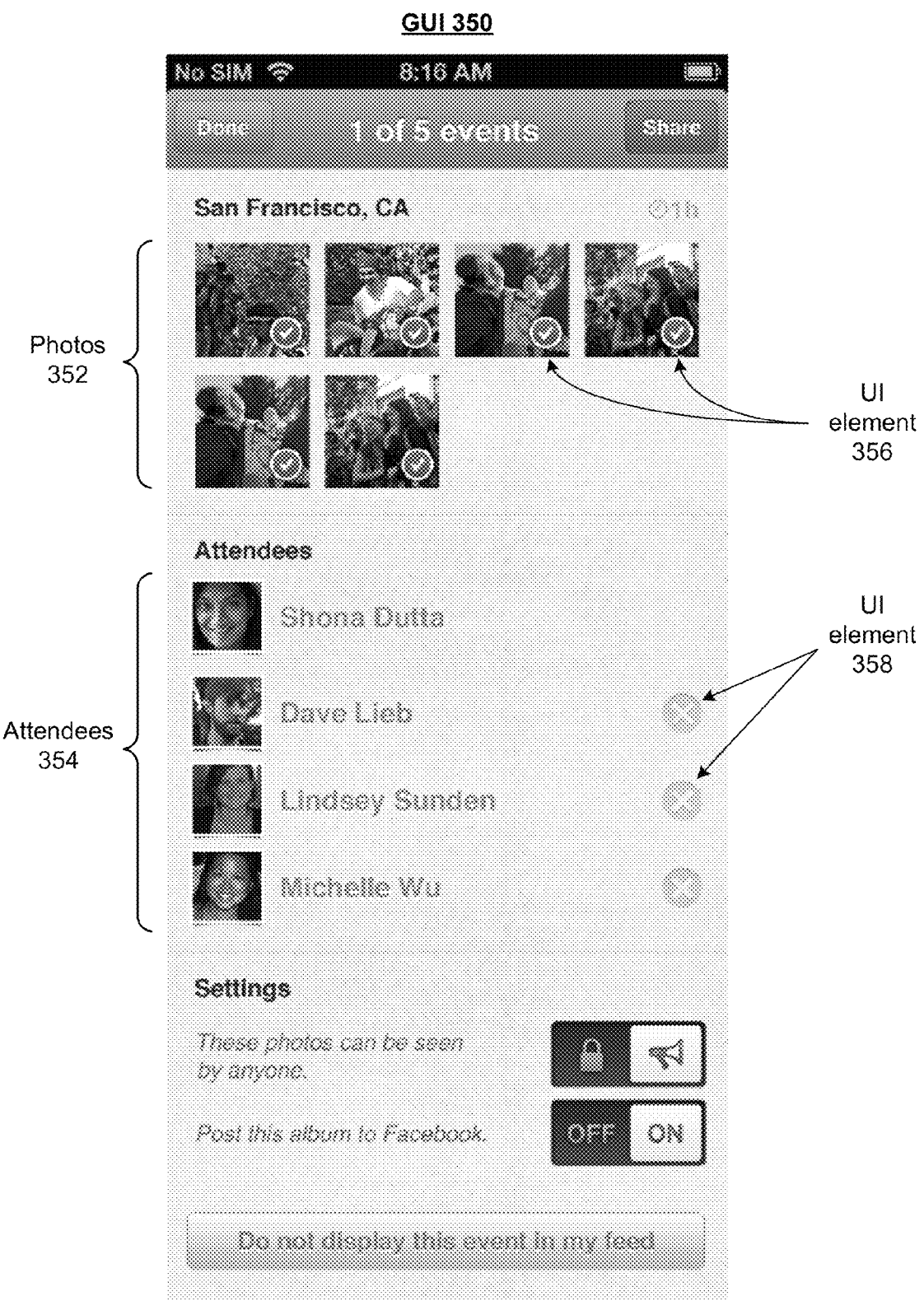
FIG. 3B illustrates a screenshot of a GUI of a device in accordance with some embodiments described herein.

FIG. 3B illustrates a screenshot of a GUI 350 of a device in accordance with some embodiments described herein. Specifically, the screenshot illustrates a subset of a set of data items, namely, photos 352, and a subset of a set of users, namely attendees 354. In the screenshot shown in FIG. 3B, the application has determined that photos 352 are likely to be shared with attendees 354. The device can then provide the user with user interface (UI) elements, e.g., UI elements 356 and 358, to change the subset of the set of photos and/or attendees.

In some embodiments, the system determines a set of co-proximate users that a person is likely to share information with. For example, an embodiment can begin with the list of friends that user u1 has on a social networking website. Next, the embodiment can filter out the friends that were not around the same place and time as user u1 when user u1 took a photo. The embodiment can then prompt user u1 with the remaining list of friends. Once user u1 identifies the friends with whom u1 wants to share the information, the embodiment can share the information with the identified friends. This example was provided for illustration purposes only. In general, embodiments can use an arbitrarily complex filter to determine the set of users with whom to share information.

According to one definition, two users are co-proximate to one another if they are around the same location around the same time. The location and time ranges that are used for determining co-proximity can depend on a number of factors, including, but not limited to, the accuracy of the location/time information, the probability that a given set of users are friends, etc.

In some embodiments, any information that was generated by any of the people (e.g., photos that were taken by any of the people while these people were co-proximate) can become available to the other people present. Each person can determine whether or not to share the information with other people, e.g., the permission can be granted by a user per photo, per event, and/or per co-proximate user. Co-proximity can be determined from location information (longitude latitude) associated with the information that is being shared (e.g., the photo) and the timestamp associated with the information that is being shared, and/or any other metadata associated with the information. Specifically, when the information that is being shared is a photo, the co-proximity can be determined from location information (longitude latitude) contained in JPEG EXIF data.

In some embodiments, the metadata is uploaded to a central server periodically without the user's explicit instructions. In other embodiments, metadata is uploaded every time information becomes available for sharing (e.g., when a photo is taken on the handheld device). In yet other embodiments, metadata is uploaded whenever the user changes location by more than a pre-determined distance. In some embodiments, co-proximity is determined from mobile device location data collected by an application running on the user's device.

Many other factors can be used to determine co-proximity. In general, the process for determining co-proximity can be viewed as an arbitrarily complex filter that uses information from multiple sources to determine a set of co-proximate users. In some embodiments, co-location duration is used to determine actual co-proximity, i.e., co-proximity between two users is inferred if the two users spend more than a threshold amount of time in proximity to each other.

In some embodiments, the device's velocity is used to determine actual co-proximity. For example, if the velocities of two different devices match over a given time period, then these two devices can be considered to be co-proximate. This can help prevent situations where a person is driving on a highway and the system determines that another person in another vehicle is co-proximate when actually the other person is not co-proximate to this user.

Other information that can be used to determine co-proximity can include (1) a hardware identifier, e.g., a freeform alphanumeric field that corresponds to a device model and/or a hardware manufacturer; (2) a software identifier, e.g., a freeform alphanumeric field that corresponds to a software type, implementation, vendor, and/or version; (3) a network address, e.g., an IP or Ethernet address; (4) a carrier identifier, e.g., a field that indicates a communication company whose network the device is using; (5) a network identifier, e.g., an identifier (e.g., the SSID of a WiFi network) that corresponds to the communication network that the device is using; (6) a node identifier in a social network, e.g., the name or website of the social network (e.g., www.facebook.com) combined with the user name or user identifier that is used in the social network; (7) a list of locations of the device over a pre-defined time period; (8) ambient temperature; (9) one or more phone numbers (e.g., the device's phone number and/or phone numbers associated with the owner of the device) stored on the device, or representations thereof, such as hashes or Bloom filters; and/or (10) a count of events that were detected over a given time period.

In some embodiments, a matching score may be determined between each pair of devices that are potentially co-proximate. Next, only those devices whose matching score with each other is greater than a threshold value can be selected as the set of co-proximate devices.

Additional factors that can be used to determine co-proximity are now discussed. If it is known that devices that have certain hardware and/or software versions and/or configurations generate more accurate location and/or time information than other devices, then the hardware and/or software identifier can be used to signal the accuracy of the time/location information that is used in the co-proximate filter. If it is more likely that co-proximate users have the same type of hardware and/or software, then this information can be used in the co-proximate filter. Similarly, the carrier identifier or the network identifier can also be used in the co-proximate filter. Theses uses of the hardware identifiers, software identifiers, carrier identifiers, and network identifiers have been presented for illustration purposes only and are not intended to limit the scope of the embodiments described herein.

In some embodiments described herein, the metadata update may include a network address, e.g., an IP or Ethernet address. Some address spaces are hierarchical, e.g., the IP address space is hierarchical. The probability that two devices are co-proximate may be greater if the corresponding network addresses are closely related in the address space hierarchy (e.g., if the two network addresses belong to the same subnet). Therefore, the network address information can also be used as one of the parameters in the co-proximate filter.

As mentioned above, a useful factor that can be used in the co-proximate filter is the relationship between two users in a social network. Distance between two users is one of many metrics that can be used to determine the strength of the relationship between two users. Another relationship metric can be based on the type and/or amount of communication between the two users. For example, the system may determine that the two users are closely related in the social network if the two users often exchange messages and/or posts on a social network website. Regardless of how the relationship strength between two users is determined, the co-proximate filter can use the relationship strength information to determine whether or not two users should be considered to be co-proximate.

In some embodiments described herein, the co-proximate filter may use a list of locations of the device over a given time period. If it is expected that users who have visited the same location(s) over a given time period are more likely to be co-proximate, then this information can be used by the filter.

In some embodiments described herein, the co-proximate filter may use an ambient temperature and/or sound recording that was recorded at a particular time. The ambient temperature and/or sound recording may be used to complement or supplement the temporal and spatial information. For example, if the temporal and spatial information from two devices indicates that the two devices are coincident in time and space, the ambient temperature information and/or sound recording can be used to validate this conclusion.

In some embodiments described herein, the co-proximate filter may use one or more phone numbers (e.g., the device's phone number and/or phone numbers associated with the owner of the device) stored on the device. If it is expected that users who wish to exchange information with one another are likely to have each other's phone numbers stored on their devices and/or have common phone numbers stored on their devices, then this information can be used to determine the set of co-proximate users.

In some embodiments, the co-proximate filter can have a learning component. For example, after the filter determines a set of co-proximate users with whom device user u1 may want to share information, the device can prompt user u1 with the information and the list of co-proximate users. Depending on user u1's response, the embodiment may modify the filter. For example, if a user removes certain users from the list, then the embodiment can modify the filter so that those users would be less likely to be selected as co-proximate users in the future.

The location information associated with a user or with a data item can be generated using a number of techniques. A Global Positioning System (GPS) receiver can be used to determine the location. Location can also be determined based on triangulating signals from multiple cell phone towers. In some embodiments, location information can also be received from a social networking application. For example, if a user posts a message or "checks in" at a store using an application, the location information associated with the message or with the "check in" operation can be used to determine the location of the user. In yet other embodiments, if a user is tagged in a photograph that has location and time information, then that can also be used to determine location and time information for the user. In some embodiments, the location information can be inferred based on the location information of another event that occurred recently. For example, the location of the handheld device is known a few minutes before the photo was taken or a few minutes after the photo was taken, then the location of the photo can be inferred based on the location of the device at a slightly different time.

Modifications and Variations

Figure 4:
FIG. 4 illustrates a screenshot of a GUI of a device in accordance with some embodiments described herein.

In some embodiments, once a set of data items have been shared with a set of users, a discussion thread can automatically be created that relates to the shared photos. FIG. 4 illustrates a screenshot of a GUI 400 of a device in accordance with some embodiments described herein. In the embodiment illustrated in FIG. 4, a set of photos that relate to an event that occurred on a particular night were shared between the device's owner and 23 other friends. A discussion thread was then automatically created to enable the users to discuss the event. As shown in FIG. 4, two users named "Lindsey Sunden" and "Bernardo Nunez" have posted comments that related to the event.

In some embodiments, a shared storage location can be created automatically for an event so that data items associated with the event can be uploaded to, and accessed from, the shared storage location by users who are associated with the event. For example, once the sharing software application determines that a group of friends were at an event (e.g., by using a co-proximate filter), the software application can create an album for that event, identify photos for each user in the group, and prompt each user in the group to upload their photos for the event to the album. The photos that a user uploads to the album can then be shared either with everyone present at the event, or with only the user's friends who were present at the event, or with a subset of the user's friends who were present at the event. Note that this sharing process is not limited to photos. Any type of information may be shared in this manner. For example, after a business meeting, the sharing software application may automatically create a "contact album," and prompt each of the attendees to upload their contact information to the album to facilitate exchanging business contact information between the attendees. Note that, in all of the examples disclosed in this disclosure, the number of users with whom information is shared can be one or more, e.g., in the embodiments that automatically create an album, the album can have one or more users. For example, if only two people, e.g., users u1 and u2, are present at an event, then the software application can prompt user u1 to create an album, and share information with user u2 via the album.

Some embodiments can keep track of the sharing behavior and use the sharing behavior during co-proximity computations. For example, if user u1 often shares information with user u2, then the software application can use this historical sharing pattern to determine whether or not information uploaded by user u1 should be shared with user u2.

Specifically, in some embodiments, the software application can determine a composite sharing score for each user. The composite sharing score can include multiple components, such as a temporal co-proximity component, spatial co-proximity component, social network distance component, historical sharing frequency component, etc. Next, the software application may select only those users whose composite sharing score is above a given threshold. If information was often shared with a particular user, then that user's historical sharing frequency component would have a high value, thereby increasing the probability that the user will be selected as one of the users with whom information will be shared.

In some embodiments, we can go back in time and look at all photos that existed before the user installed the software application. In some embodiments, once the software application is installed, it can be kept running in the background and gain access to the users location.

The processing can be arbitrarily divided between the handheld device and the server. For example, in some embodiments the handset determines if a photo was taken by a user (and therefore may be a candidate for sharing), or whether the photo was taken by another user (and therefore may not be a candidate for sharing). The determination of the set of co-proximate users can then occur at the server.

In some embodiments, the system shares photos that originated on the device. Factors that can be used to determine whether or not a photo originated on the device include the size of the photo, EXIF data, filename counter increment, etc.

In some embodiments, the handheld device may not embed time and/or location information in the photo. In these embodiments, the executing software application can add the time/location information as required.

The location information can be made accurate based on other information that is known about the user. For example, if the location information indicates that the person is in the vicinity of his/her home, and if the person does not appear to be moving, then the application can assume that the person is at his/her home. In this example, the accuracy of the location information was significantly improved based on other information (e.g., the home address of the person).

Other inputs that can be used in the co-proximate filter include calendar appointments, contents of emails, etc. Information that a person may want to share could include information that the person was using during an event. For example, if a user was listening to a song or looking at a map during a hike, then this information can be tagged as something that the person may want to share with other co-proximate users.

In some embodiments, locations can be clustered and ranked with distance, frequency, duration, time of day, and media generation (home/work, favorite places within multiple spatial/temporal scales, etc.). Some embodiments can automatically create a timeline of the user's behavior based on information including: time, location, co-proximity, media generated (photos, video), etc. The recorded information can then be used to create a personal log. For example, the recorded information can be segmented into trips based on the user's geo-temporal data. Trips can be ranked as a function of distance from special locations, visit frequency, duration, and other users in co-proximity. Media recorded during any trip may be shared with other users.

The recorded information can be analyzed and results can be generated based on the user's behavior and co-proximity. For example, the analytics can help a user determine his/her pattern of commute, work, and home activities. Friends within co-proximity can be ranked by proximity duration. The places that a person visits can be ranked by self-generated and other-labeled behavior metrics. Badges can be awarded based on improvement in a user's behavioral metrics and/or based on comparing the user's metrics with metrics of other users.

The type of content that selected for sharing and the set of co-proximate users can depend on a variety of factors including, the content of the information itself (e.g., is it a photo of a person, an animal, a building, etc.), the location (e.g., is was the photo taken at home, work, vacation, bar, etc.), the time of day (e.g., photos taken during work hours are more likely to be shared with colleagues), camera type, the list of co-proximate users (e.g., the person(s) whom you are with—e.g., family, friends, co-workers, etc.). The location information can be inferred from events in your calendar, events in a social networking website, tagged photos, locations of credit card purchases.

Frequency of co-location can be used to determine friend strength and/or to generate new social network graph ("co-proximate buddies"). If we have raw access to handset MAC address (network interface unique ID) and signal strength of a WiFi or Bluetooth signal, we can potentially determine relative location/closeness (as opposed to absolute location which is what a GPS receiver determines). An unusual activity may trigger photo taking suggestion (unusual activity may include co-proximity to a new place and/or new people).

Some embodiments described herein can be used to determine user-oriented views of events. In these embodiments, there is no canonical album. Instead, everyone has their own "lens" into the event. The co-proximate information can be used to highlight the people who are important to you.

Computer

Figure 5:
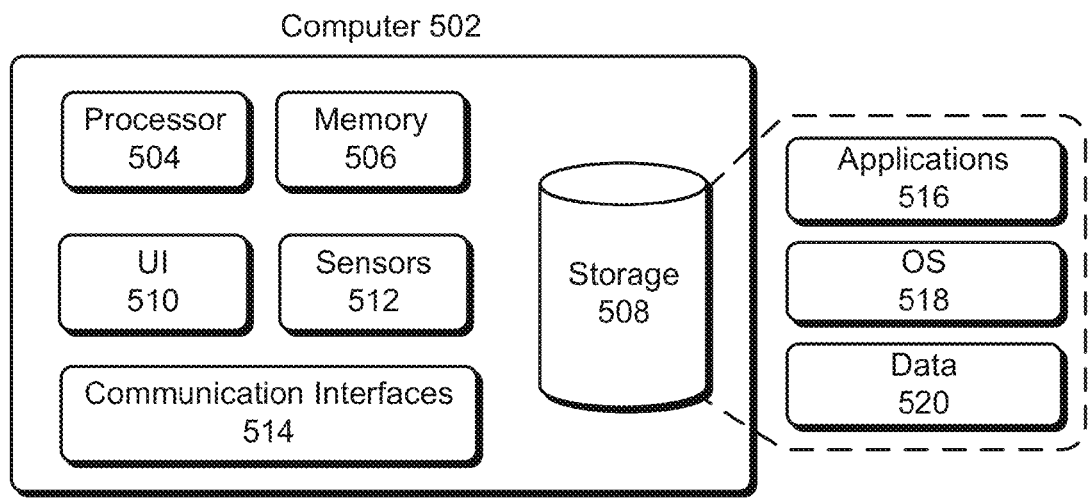
FIG. 5 illustrates a computer in accordance with some embodiments described herein.

FIG. 5 illustrates a computer in accordance with some embodiments described herein. A computer can generally refer to any hardware apparatus that is capable of performing computations. Specifically, devices 104-110 and server 102 shown in FIG. 1 can each be a computer. As shown in FIG. 5, computer 502 can include processor 504, memory 506, user interface 510, sensors 512, communication interfaces 514, storage 508, microphone 522, and speaker 524.

User interface 510 can generally include one or more input/output mechanisms for communicating with a user (e.g., a keypad, a touchscreen, a microphone, a speaker, a display, etc.). Sensors 512 can include one or more inertial sensors (e.g., accelerometer, gyroscope, etc.) and/or other types of sensors (e.g., light meters, pressure gauges, thermometers, etc.). Communication interfaces 514 can generally include one or more mechanisms for communicating with other computers (e.g., Universal Serial Bus interfaces, network interfaces, wireless interfaces, etc.). Storage 508 may be a non-transitory storage medium, and may generally store instructions that, when loaded into memory 506 and executed by processor 504, cause computer 502 to perform one or more processes for facilitating communication with another computer. Specifically, storage 508 may include applications 516, operating system 518, and data 520. Applications 516 may include software instructions that implement, either wholly or partly, one or more methods and/or processes that are implicitly and/or explicitly described in this disclosure.

Computer 502 has been presented for illustration purposes only. Many modifications and variations will be apparent to practitioners having ordinary skill in the art. Specifically, computer 502 may include a different set of components than those shown in FIG. 5.

Apparatus

Figure 6:
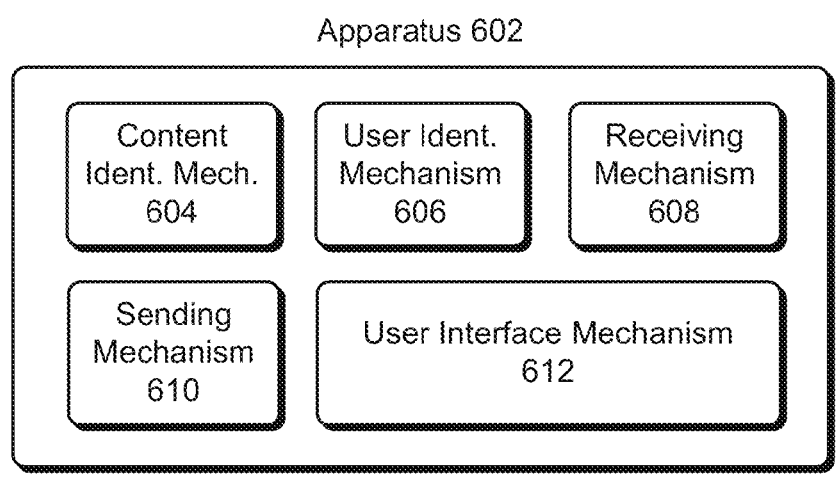
FIG. 6 illustrates an apparatus in accordance with some embodiments described herein.

FIG. 6 illustrates an apparatus in accordance with some embodiments described herein. Apparatus 602 can comprise a number of hardware mechanisms, which may communicate with one another via a wired or wireless communication channel. A hardware mechanism can generally be any piece of hardware that is designed to perform one or more actions. For example, a sending mechanism can refer to transmitter circuitry, and a receiving mechanism can refer to receiver circuitry. In some embodiments described herein, apparatus 602 can include content identifying mechanism 604, user identifying mechanism 606, receiving mechanism 608, sending mechanism 610, displaying mechanism 612, and user interface mechanism 614. The apparatus shown in FIG. 6 is for illustration purposes only. Many modifications and variations will be apparent to practitioners having ordinary skill in the art. Specifically, apparatus 602 may include a different set of mechanisms than those shown in FIG. 6. Apparatus 602 can be capable of performing one or more methods and/or processes that are implicitly or explicitly described in this disclosure.

In some embodiments, content identifying mechanism 604 is capable of identifying content that is likely to be shared with a set of users, user identifying mechanism 606 is capable of identifying a set of users with whom the identified content is likely to be shared, receiving mechanism 608 is capable of receiving information from other computers, sending mechanism 610 is capable of sending information to other computers, and user interface mechanism 612 is capable of receiving input from a user and providing information to a user.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art.

What is claimed is:

1. A method for sharing information, the method comprising:
  receiving, at a computing device, a set of data items to be analyzed for sharing;
  analyzing, by the computing device and based on a first set of criteria that includes a time window and a spatial region, the set of data items to determine a subset of the set of data items that were created during the time window at a location that is within the spatial region, the subset of data items being a likely candidate for sharing;

receiving, at the computing device, a set of users to be analyzed for sharing information;

analyzing, by the computing device and based on a second set of criteria, the set of users to obtain a subset of the set of users with whom the information is likely to be shared; and outputting, by the computing device and for concurrent presentation to the user, the subset of the set of data items and the subset of the set of users.

2. The method of claim 1, wherein the second set of criteria includes a time window, a spatial region, and a distance threshold in a social network, and wherein analyzing the set of users includes determining users that are within the distance threshold from the first user in the social network and who also were within the spatial region during the time window.

3. The method of claim 1, further comprising:

outputting, by the computing device and for presentation to the user, a first set of user interface elements to enable the user to modify the subset of the set of data items; and outputting, by the computing device and for presentation to the user, a second set of user interface elements to enable the user to modify the subset of the set of users.

4. A non-transitory computer readable storage medium storing instructions that, when executed by a computer, cause the computer to:

receive a set of data items to be analyzed for sharing;

analyze, based on a first set of criteria that includes a time window and a spatial region, the set of data items to determine a subset of the set of data items that were created during the time window at a location that is within the spatial region, the subset of data items being a likely candidate for sharing;

receive a set of users to be analyzed for sharing information;

analyze, based on a second set of criteria, the set of users to obtain a subset of users with whom the information is likely to be shared; and output, for concurrent presentation to the user, the subset of the set of data items and the subset of the set of users.

5. The non-transitory computer readable storage medium of claim 4, wherein the second set of criteria includes a time window, a spatial region, and a distance threshold in a social network, and wherein analyzing the set of users includes determining users that are within the distance threshold from the user in the social network and who also were within the spatial region during the time window.

6. The non-transitory computer readable storage medium of claim 4 further storing instructions that, when executed by the computer, cause the computer to:

output, for presentation to the user, a first set of user interface elements to enable the user to modify the subset of the set of data items; and output, for presentation to the user, a second set of user interface elements to enable the user to modify the subset of the set of users.

7. An apparatus, comprising:

a processor;

a monitor; and a non-transitory storage medium storing instructions that, when executed by the processor, cause the apparatus to:

receive a set of data items to be analyzed for sharing;

analyze, based on a first set of criteria that includes a time window and a spatial region, the set of data items to determine a subset of the set of data items that were created during the time window at a location that is within the spatial region, the subset of data items being a likely candidate for sharing;

receive a set of users to be analyzed for sharing information;

analyze, based on a second set of criteria, the set of users to obtain a subset of users with whom the information is likely to be shared; and output, for concurrent presentation to the user, the subset of the set of data items and the subset of the set of users.

8. The apparatus of claim 7, wherein the second set of criteria includes a time window, a spatial region, and a distance threshold in a social network, and wherein analyzing the set of users includes determining users that are within the distance threshold from the user in the social network and who also were within the spatial region during the time window.

9. The apparatus of claim 7 further storing instructions that, when executed by the processor, cause the apparatus to:

output, for presentation to the user, a first set of user interface elements to enable the user to modify the subset of the set of data items; and output, for presentation to the user, a second set of user interface elements to enable the user to modify the subset of the set of users.

* * * * *